(12) United States Patent
Sauer

(10) Patent No.: US 12,376,699 B2
(45) Date of Patent: Aug. 5, 2025

(54) BAKING OR ROASTING PAN FOR AN OVEN

(71) Applicant: SAUERCONCEPT PATENT A/S, Fredensborg (DK)

(72) Inventor: Steen Sauer, Fredensborg (DK)

(73) Assignee: SAUERCONCEPT PATENT A/S, Fredensborg (DK)

( * ) Notice: Subject to any disclaimer, the term of this patent is extended or adjusted under 35 U.S.C. 154(b) by 98 days.

(21) Appl. No.: 18/288,548

(22) PCT Filed: Mar. 17, 2022

(86) PCT No.: PCT/EP2022/057052
§ 371 (c)(1),
(2) Date: Oct. 26, 2023

(87) PCT Pub. No.: WO2022/195039
PCT Pub. Date: Sep. 22, 2022

(65) Prior Publication Data
US 2024/0206675 A1 Jun. 27, 2024

(30) Foreign Application Priority Data
Mar. 19, 2021 (EP) .................................... 21163702

(51) Int. Cl.
A47J 37/10 (2006.01)
A47J 37/01 (2006.01)

(52) U.S. Cl.
CPC ...................... A47J 37/01 (2013.01)

(58) Field of Classification Search
CPC .. A47J 37/01; A47J 37/00; A47J 37/10; F16K 31/44
(Continued)

(56) References Cited

U.S. PATENT DOCUMENTS 2,293,476 A 8/1942 Snellings
4,352,324 A * 10/1982 Noh ........................ A47J 37/10
99/425

(Continued)

FOREIGN PATENT DOCUMENTS

DE 20 2017 107469 U1 1/2018
EP 1 459 664 A1 9/2004
(Continued)

OTHER PUBLICATIONS

International Patent Application No. PCT/EP2022/057052 International Search Report dated Jul. 15, 2022, 2 pages.

Primary Examiner — Stephen J Castellano
(74) Attorney, Agent, or Firm — Cozen O'Connor

(57) ABSTRACT

A baking or roasting pan for an oven includes a pan outlet arranged in the bottom or at the bottom of a side of the baking pan for letting out fluid in the pan, and a valve for controlling a flow of said fluid through the pan outlet. The valve has an inlet port for receiving the fluid, an outlet port in fluid communication with the pan outlet, and an actuator for opening and closing the valve. The actuator is operated by an actuator member that engages with an actuator member of a collecting device operated by a user such that the valve opens for the flow of the fluid when being engaged by the collecting device for a safe and clean emptying of the pan. The invention also relates to a kit of parts comprising the baking or roasting pan and a collecting device.

13 Claims, 3 Drawing Sheets

(58) Field of Classification Search
USPC .............................................. 220/571, 573.1
See application file for complete search history.

(56) References Cited

U.S. PATENT DOCUMENTS

| | | | | |
|---|---|---|---|---|
| 5,160,829 | A | * | 11/1992 | Chang .................... F24C 15/162 |
| | | | | 219/400 |
| 5,467,696 | A | * | 11/1995 | Everhart ................. A47J 37/10 |
| | | | | 99/425 |
| 2017/0094984 | A1 | * | 4/2017 | Blue ....................... A23B 4/052 |
| 2019/0346060 | A1 | * | 11/2019 | St-Jean ................... F16K 31/44 |

FOREIGN PATENT DOCUMENTS

| | | |
|---|---|---|
| EP | 2 702 911 A1 | 3/2014 |
| GB | 2 291 785 A | 2/1996 |

* cited by examiner

BAKING OR ROASTING PAN FOR AN OVEN

CROSS-REFERENCE TO RELATED APPLICATIONS

This application is a US National phase Application of International Patent Application No. PCT/EP2022/057052 filed Mar. 17, 2022, which claims priority to EP 21163702.0 filed Mar. 19, 2021, both of which are hereby incorporated in their entireties.

The present invention relates to a baking or roasting pan for an oven and kit of parts comprising the baking or roasting pan, and a collecting device (drainage pan) for collecting fluid in the baking or roasting pan.

Baking and roasting pans are widely used for preparing food in an oven. Normally, the pans are designed quite simply with a rectangular shape and having a bottom and a side wall. The simple shape ensures that the pan can be easily inserted in an oven for food preparation.

During food preparation in an oven, particular roasts of meat will give off liquid, which will seep out of the meat during heating in the oven. The liquid will be collected in the pan and if the liquid is to be used, e.g. for preparation of sauce, you will have to remove the pan from the oven and pour the liquid from the pan into a container or cocking pot. As the liquid and the pan is normally very hot, i.e. above 100 degrees Celsius when removed from the oven, this may be a risky process which can cause injuries on persons such as burn injuries.

Moreover, as the hot pan is normally removed from the oven by a person using pot holders or oven gloves, the pan and its content may be difficult to control, which again may promote the risk of accidents and injuries.

An object of the present invention is to provide a baking or roasting pan, which can be removed from a hot oven in a safe manner.

A further object is to provide a baking or roasting pan from which liquid can be extracted in an easy and uncomplicated manner.

The present invention relates to a baking or roasting pan for an oven comprising:
  a bottom for placing a food article to be baked,
  a side extending upwards from said bottom for containing a fluid in said baking or roasting pan,
  a pan outlet arranged in said bottom or at the bottom of said side for letting out said fluid,
  a valve for controlling a flow of said fluid trough said pan outlet,
  said valve having
  an inlet port for receiving said fluid,
  an outlet port in fluid communication with said pan outlet,
  an actuator for opening and closing said valve,
  said actuator having a closed state and an open state, and
  an actuator member for operating said actuator by engaging said actuator member with a collecting device operated by a user
  such that said valve opening for said flow of said fluid when being engaged by said collecting device for a safe and clean emptying of said baking pan.

The pan is to be arranged for use for a home appliance oven, i.e. a household oven. The width of the oven may be up to 90 cm, i.e. the width of the baking or roasting pan being less than 90 cm.

The side of the baking or roasting pan is to have a height such that a pan is formed having a depth for containing a liquid. An example of a height could be in the range of 0.5 to 10 cm, such as 1 to 8 cm, or such as 2 to 6 cm. The baking or roasting pan may constitute a deep pan, i.e. a pan having a side with a height in the higher end of the mentioned ranges.

According to the invention, the pan comprises a pan outlet in a bottom part and the valve is placed in and controls the flow of fluid or liquid through the outlet. The control is managed by an inlet port connected with an actuator. The actuator is operated by engagement of an actuator member with a collecting device.

The collecting device is preferable a handheld device which can engage with the valve and the actuator member while the pan is in an oven.

When the collecting device engages with the actuator member, the actuator will open the inlet port in the valve and fluid can flow through the valve and out of the pan. Preferably, the collecting pan includes a collecting compartment into which the liquid may flow.

The collecting department may be formed to have a volume between 0.25 to 3 liters. The height of the collecting department may be 0.5 to 15 cm such as 1 to 10 cm, such as 1 to 5 cm.

Dependent on the hinge arrangement of the oven, the collecting device may have different forms. For example, when the pan is used together with an oven having a side-hinged door, the collecting compartment may have a height in the higher end of the above-mentioned range, such as between 5 to 10 cm.

The collecting device may be arranged such that when it actuates the actuator member, an opening into the collecting compartment is below the pan outlet such that the liquid falls down into the opening.

The pan, the valve, the actuator and the collecting device are made from material, which can resist heat from an oven, and preferably made from steel, such as stainless steel.

As e.g. a roast may not only give off liquid during the heat treatment in the oven, but also particles of meat and other impurities, a filter is preferably mounted at the inlet port for filtering impurities from said fluid.

In an embodiment of the baking or roasting pan, the filter is replaceable. Thus, when the filter is stuffed up by impurities, the filter can be replaced and optionally cleaned and re-used.

The valve in the baking or roasting pan according to the invention preferably has a valve with a valve axis orthogonal to the bottom of the pan, and the valve turning between the closed state and the open state around the axis. This means that the inlet port, which opens and closes the valve, rotates around the valve axis for opening and closing the valve.

The baking or roasting pan in an embodiment comprises a pawl for guiding the collecting device. The pawl may e.g. be mounted on or in relation to the valve, such that the collection members are guided to the valve for collecting the fluid in the pan. The baking or roasting pan can then be emptied for fluid in an easy and safe manner.

The invention also relates to a kit of parts comprising the baking or roasting pan described above, and a collecting device for collecting the fluid in the baking or roasting pan.

In an embodiment of the kit of parts comprising the baking or roasting pan and a collecting device, the collecting device comprises the collecting device.

In an embodiment, the collecting device has a first track such that the actuator member will be moved by the first track when the tray member engages the actuator member. The actuator, which controls the opening and closing of the valve is in this manner activated by the collecting device and the first track in the collecting device, such that the valve will open and allow a flow of fluid through the valve.

For the purpose of facilitating the handling of the baking or roasting pan and the collecting device, the collecting device preferably has a handle for holding the collecting device. The handle is preferably mounted on the collecting device, such that no heat from the oven or the baking or roasting pan will reach the handle.

In an embodiment of the kit of parts, the collecting device has a compartment for containing the fluid. Thus, the fluid from the baking or roasting pan, which can be rather warm can be collected and contained/stored in a safe manner in the compartment in the collecting device.

The kit of parts according to the present invention also includes an embodiment where the collecting device has an inlet extending under the pan outlet when the collecting device is engaging the actuator member.

In an embodiment, the kit of parts, the collecting device has a second track for guiding the collecting device while the actuator member being moved.

Preferably, the first track is curved and preferably, the second track is linear. The first track engages the actuator member, which should be moved in a non-linear manner to effect the opening of the valve in the pan. The second track serves as guiding means for the engaging the pan and the collecting device and should preferably be linear.

The invention will now be described in further details with reference to drawings in which:

The figures are only intended to illustrate the principles of the invention and may not be accurate in every detail. Moreover, parts which do not form part of the invention may be omitted. The same reference numbers are used for the same parts.

FIG. 1 shows a baking or roasting pan 1 and collecting device 10 constituting a collecting tray.

The pan 1 is shaped as a traditional pan with bottom and side defined by a sidewall 6 extending from the bottom.

Figure 1:
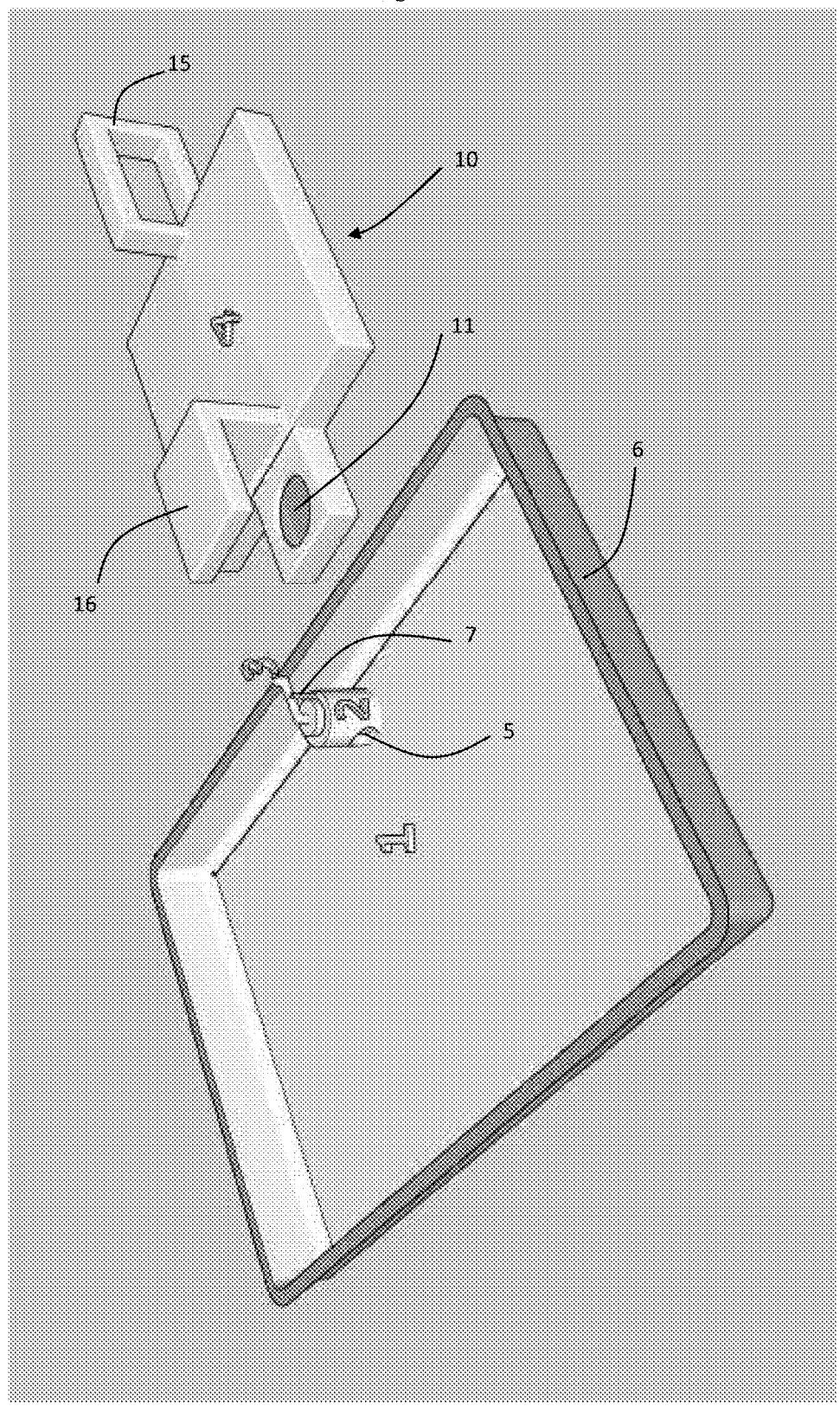
FIG. 1 illustrates a baking or roasting pan and collecting device according to the invention seen from above.

The pan may have a pan outlet (hole) in the bottom or at a lower part of the sidewall for letting fluid out of the pan. The pan outlet is not visible on FIG. 1.

Arranged in connection with the outlet is a valve 2. The valve has an inlet port 5 and an outlet port (not shown), and a passage between the inlet port and outlet port for passage of a liquid through the valve. The outlet port is arranged over the pan outlet.

The flow of liquid through the valve is controlled by a valve member for closing and opening the valve.

The valve member may be actuated by an actuator member 3. The actuator member is arranged to be operated by the collecting device.

The actuator member may be L-shaped—the foot of the L-shaped actuator member may be a knob, and the opposite end of the L-shaped actuator member may be attached to a stem of the valve.

The valve further comprises a pawl 7, which serves to guide the collecting device 10 when operating the actuator member.

The collecting device 10 comprises a compartment 4 for containing liquid collected from the pan. The compartment is closed (besides from having an opening/inlet 11 into the compartment for receiving liquid from the outlet of the pan). The opening is arranged on top of the compartment.

The collecting device has a handle 15 for holding the collecting device.

The collecting device comprises a collecting arm 16 extending from the collecting device for operating the actuator member.

The collecting device is arranged such that the collecting arm extends over the pan, and the inlet 11 is below the pan when operating the actuator member with the collecting device.

The collecting arm is arranged opposite the handle.

Figure 2:
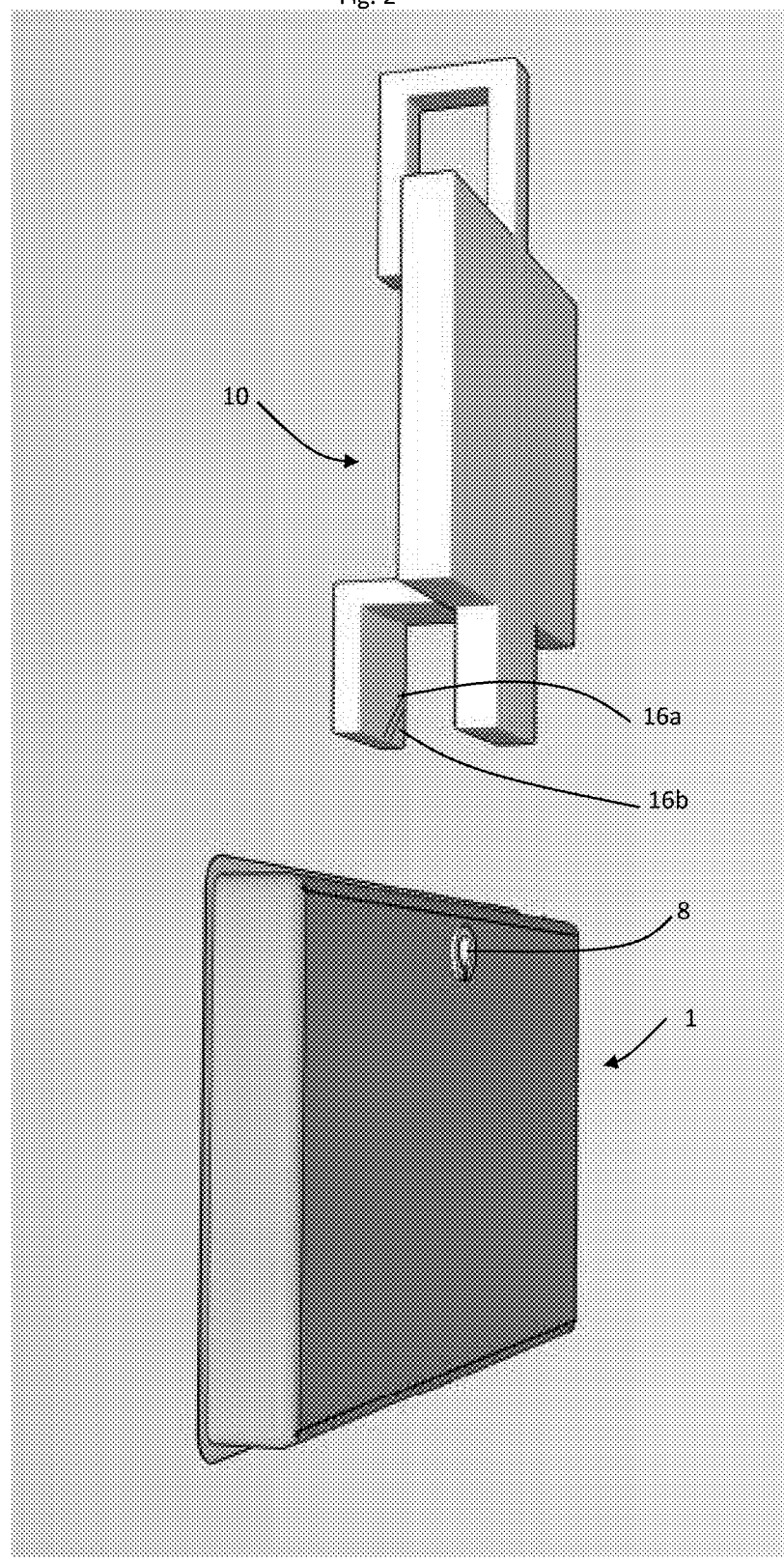
FIG. 2 illustrates a baking or roasting pan and collecting device according to the invention seen from below.

FIG. 2 shows the pan 1 and the collecting device 10 from below.

In the pan bottom is a pan outlet 8 adapted for engagement with the inlet 11 on the collecting device 10.

The pan outlet 8 is connected with the valve 2 and the inlet port 5 such that liquid/fluid from the pan 1 can be transported to the collecting device 10 via the pan outlet 8 and the inlet 11.

When the fluid from the pan 1 is transferred to the collecting device 10, it is contained in the compartment. When the fluid is to be used, it can be poured out of the collecting device 10 via the inlet 11. Alternatively, the collecting may have a compartment outlet, which is separate from the inlet.

FIG. 2 also shows details of the arm 16, which comprises an actuator track 16*a* for engagement with the actuator member on the valve 2—the knob/handle of the actuator member may go into the actuator track.

The actuator track 16*a* has a course, which will move/rotate the actuator member sideways during engagement and thereby open the valve and provide a free flow for fluid from the pan 1 to the collecting device 10 via the inlet port 5, pan outlet 8 and inlet 11, i.e. the actuator track may be curved or it may be substantially linear/straight, but having an angle with respect to a guide track 16*b*.

The collecting member 16 also comprises a guide track 16*b*, which is substantially linear and is adapted for engagement with the pawl 7 for guiding the collecting device 10 in respect of the pan 1.

The shape of the actuator track and the guide track may be exchanged—such that the actuator track may be substantially linear and the guide track may be curved.

Both of the tracks may also be curved, or they may be linear and having an angle with respect to the movement of the collecting device, i.e. when it is intended that the collecting device is to be moved along a substantially straight line towards the pan.

The collecting device may also be a tool (without a compartment for containing liquid) for operating the actuator member, i.e. the tool may comprise an arrest for the actuator member for moving the actuator member. At the same time, a compartment may be held below the pan outlet for receiving the liquid from the pan.

Figure 3:
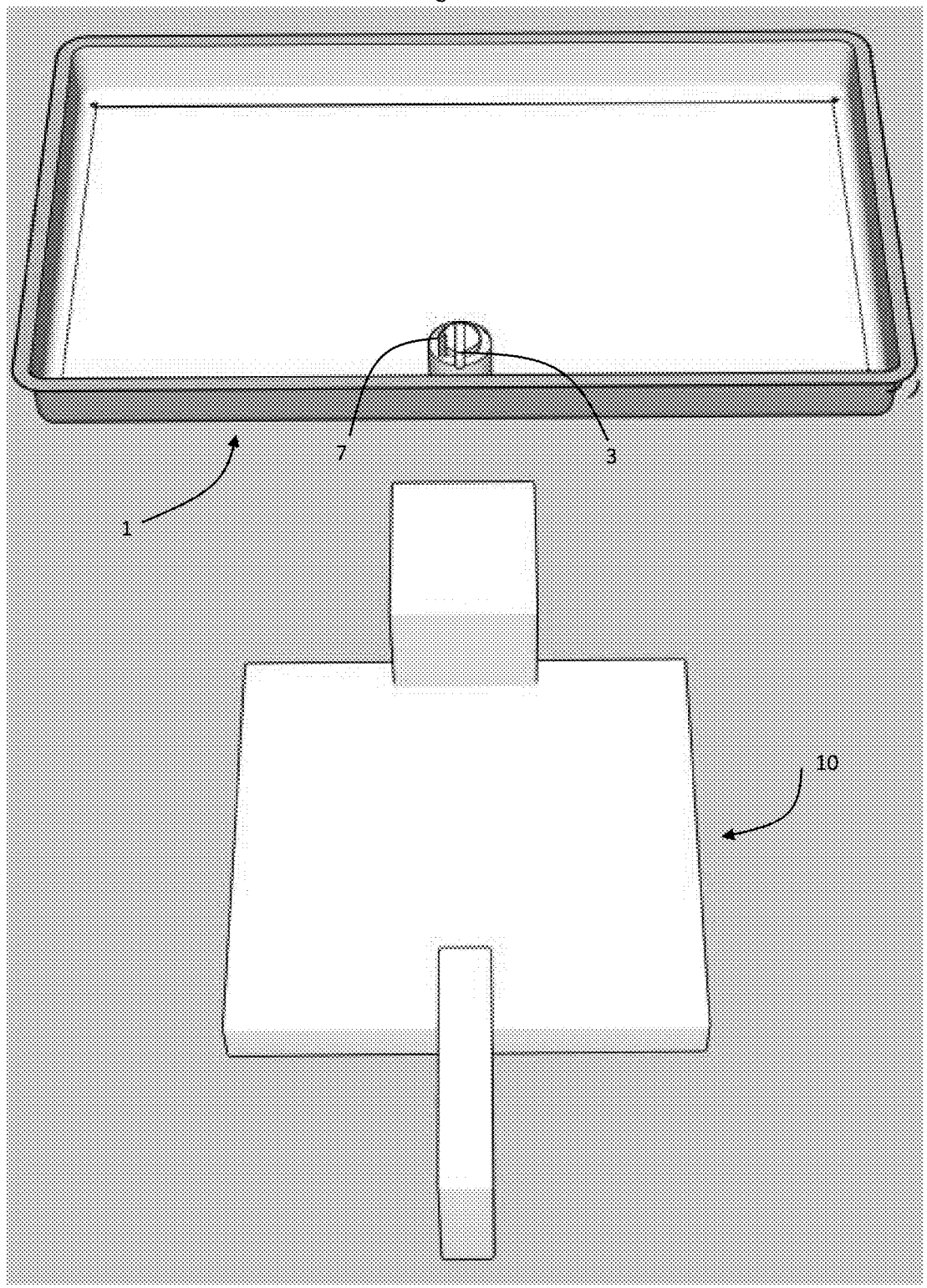
FIG. 3 is an overview of the kits of parts of the invention.

FIG. 3 illustrates the kits of parts as seen from a user perspective as the user is moving the collecting device towards the pan inside an oven (the oven is not illustrated in the figure.

The parts include the pan 1 and the collecting device 10. The pan 1 is a traditional rectangular pan with bottom and side.

The pan 1 also includes the valve with actuator member 3 and pawl 7 for operating the valve and engaging the pan 1 and the collecting device 10 with the collecting member 16, compartment and handle 15.

The figures only illustrate an embodiment of the present invention and the skilled person will realize that the invention can be realized in many other ways. The valve may e.g. be constructed in a different way and the pan and the collecting device may have different sizes and shapes than shown in the illustrated examples.

The invention claimed is:

1. A kit of parts comprising:
   a pan for baking or roasting for a household oven comprising:
      a bottom for placing a food article to be baked,
      a side extending upwards from said bottom for containing a fluid in said pan,
      a pan outlet arranged in said bottom or at the bottom of said side for letting out said fluid,
      a valve for controlling a flow of said fluid trough said pan outlet, said valve having:
         an inlet port for receiving said fluid,
         an outlet port in fluid communication with said pan outlet,
         an actuator for opening and closing said valve, said actuator having a closed state and an open state, and
         an actuator member for operating said actuator by engaging said actuator member with a collecting device operated by a user
         such that said valve opens for said flow of said fluid when being engaged by said collecting device for a safe and clean emptying of said pan; and
   a collecting device for collecting said fluid in said pan.

2. The kit of parts according to claim 1, said collecting device comprising a collecting compartment for containing said fluid.

3. The kit of parts according to claim 2, said collecting device having a first track such that said actuator member being moved by said first track when said collecting compartment engages said actuator member.

4. The kit of parts according to claim 3, said collecting device having a second track for guiding said collecting device while said actuator member is moved.

5. The kit of parts according to claim 4, said second track being linear.

6. The kit of parts according to claim 3, said first track being curved.

7. The kit of parts according to claim 1, said collecting device having a handle for holding said collecting device.

8. The kit of parts according to claim 1, said collecting device having an inlet extending under said pan outlet when said collecting device engages said actuator member.

9. The kit of parts according to claim 1, said pan being a deep pan.

10. The kit of parts according to claim 1, comprising a filter at said inlet port for filtering impurities from said fluid.

11. The kit of parts according to claim 10, said filter being replaceable.

12. The kit of parts according to claim 1, said valve having a valve axis orthogonal to said bottom, said valve turning between said closed state and said open state around said valve axis.

13. The kit of parts according to claim 1, comprising a pawl for guiding said collecting device.

* * * * *